Aug. 9, 1932. W. S. SMITH 1,870,929
SCALE
Filed Nov. 2, 1928
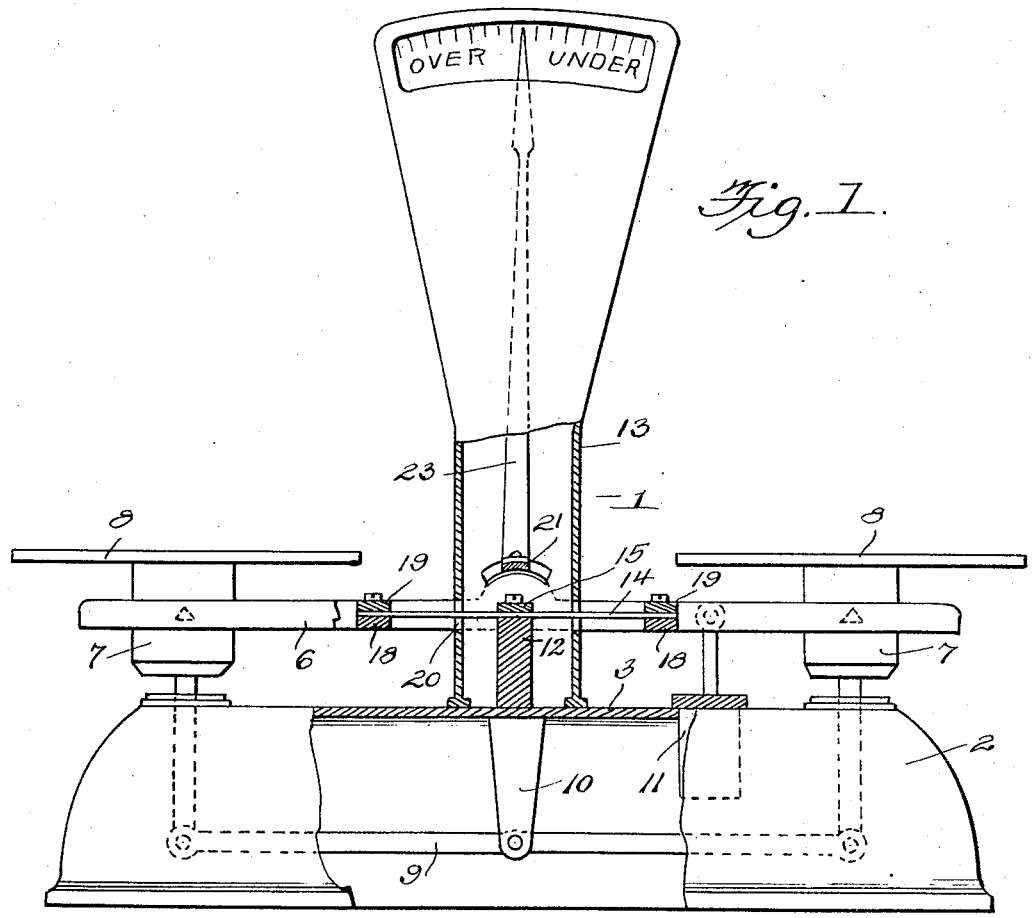
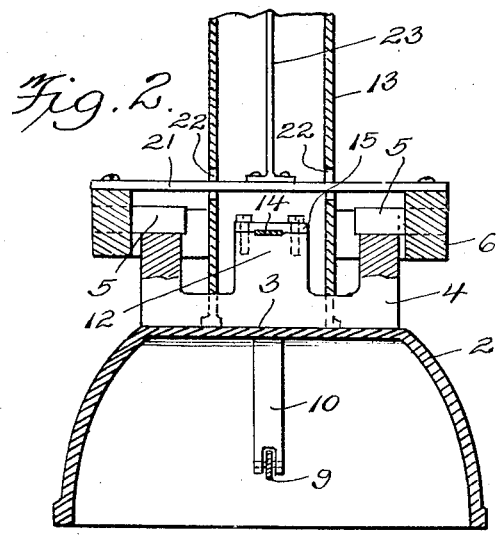
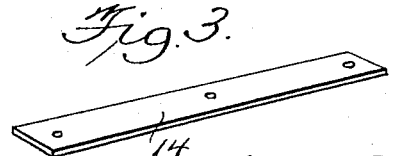
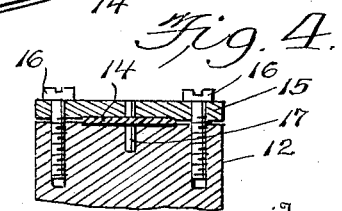
Inventor
Walter S. Smith
By W. S. McHowell
Attorney Patented Aug. 9, 1932

1,870,929

UNITED STATES PATENT OFFICE

WALTER S. SMITH, OF BROOKLYN, NEW YORK

SCALE

Application filed November 2, 1928. Serial No. 316,786.

This invention relates to improvements in weighing scales and has particular reference to scales of the type employing beams or levers which are pivotally mounted in approximately the center thereof in connection with fixed supports, and wherein the opposite ends of the beams or levers are adapted to receive substantially equal weights or loads to effect the balancing of said beams or levers.

In scales of this type it is customary to provide spring means for the purpose of restoring a pivoted beam or lever to a normal or balanced position when the opposite ends of the beam are equally weighted, whereby the beam may be maintained in such a balanced or movable position until one end or the other thereof receives a preponderance of weight. For accomplishing this purpose prior constructions have utilized torsion strips or elements, whereas in other corresponding constructions coil springs have been utilized and in certain instances leaf or flat springs. Most of these elements, however, are open to the objection that under the stresses and strains imparted to the scales in actual operation, they tend to crystallize or break or become permanently distorted so that their usefulness is lost.

It is the primary object of the present invention to provide in an even balance scale an improved spring element for maintaining in or restoring a beam to a desired normal position, and wherein the spring element is so located and related to the beam as to avoid imparting excessive strains to the spring element during the repeated operations imparted to a scale in use.

More particularly the invention resides in providing an even balance scale with a base upon which a pivoted even balance beam is mounted, and wherein the spring element takes the form of a spring steel strip or bar which is located in the horizontal plane of the beam and wherein the strip is clamped in approximately the center thereof to the base and has its opposite end portions likewise clamped in connection with the beam proper, this arrangement being such as to permit the spring element to freely flex and bend to accord with the pivotal movements of the beam but without placing said spring under stresses or strains which would be apt to produce short wearing life on the part of said spring.

It is another object of the invention to provide a scale with an indicator which is mounted for movement in unison with the beam and mounted independently of the spring element, the construction and arrangement of the indicator being such as to multiply the movement of the beam so that the operator may observe the relation of the beam to its normal position regardless of how small the degree of deflection of the beam from its normal position may happen to be.

It is a further object of the invention to provide a scale of improved construction which is readily adaptable of manufacturing methods so that it may be produced in commercial quantities of relatively low costs and wherein the scale, when in operation, possesses a very high degree of accuracy and is uninfluenced by changes in temperature or in the operating plane which the scale occupies.

With these and other considerations in view which will appear as the description proceeds, the invention consists in the novel features of construction, combinations of elements and arrangements of parts hereinafter to be fully described and pointed out in the appended claims.

In the accompanying drawing:

Figure 1 is a view in side elevation and partly in vertical section of a weighing scale constructed in accordance with the present invention, Figure 2 is a transverse vertical sectional view taken through the scale, Figure 3 is a perspective view of the spring element, Figure 4 is a vertical transverse sectional view disclosing the method of securing the spring element to the base of the scale.

Referring more particularly to the drawing, the numeral 1 designates the scale in its entirety. Generally, the scale consists of a base 2, which is preferably of metallic construction and so designed in shape as to provide a high degree of stability when placed upon a store counter or other supporting surface. The horizontal upper wall 3 of the base is provided centrally with a transversely extending bearing bracket 4, formed to include horizontally arranged and transversely aligned knife edged sockets, which are employed to receive, as is customary in scale practice, a fixed horizontally extending knife edged trunnion 5, which projects inwardly and rigidly from substantially the central portion of a weighing lever or beam 6, whereby the latter is pivotally mounted for limited swinging movement in a vertical plane. The beam on the opposite sides of its pivotal support, is substantially equally weighted so that it is of the so-called even balance type. The outer ends of the beam are pivotally connected, as usual, with out-riders 7, which carry suitable weight receivers 8, the latter being supported by the outer ends of the beam, as is customary, so as to move in unison therewith. The lower ends of the out-riders or stems 7 are connected pivotally with the opposite ends of a check rod 9, the latter being mounted, as usual, within the confines of the base 2 and is pivotally supported by means of a bracket 10, the pivotal connection between the bracket 10 and the check rod being located in vertical alignment with the trunnions 5 of the beam. The beam, the weight receivers and the check rod thus produce a parallelogram wherein the pivotal distances or centers between the same are constantly maintained throughout all positions of operation of the scale. A dash pot 11 may be mounted in the base of the scale and is connected, as usual, with the beam 6 so as to dampen or stabilize the oscillations of said beam when the latter is subjected to weighing operations.

An even balance beam of the type indicated herein does not of itself tend to return to a normal or horizontal position. By way of illustration, reference is made to an ordinary vehicle wheel. If such a wheel is truly balanced for rotation about its axial center a balance of aligned spokes thereof may stop at any position in the plane of rotation of the wheel when the latter comes to rest following rotative movement. Thus in the case of an even balance scale beam it is necessary to provide a mechanical aid to restore or maintain the beam in a desired normal position when the beam is equally weighted at both ends.

In order to provide a simple mechanical means for attaining this end the bearing bracket 4 is provided centrally with an upstanding portion 12 located in the bottom portion of the indicator tower 13. Clamped to the upper surface of the bracket portion 12 is a flat leaf spring or steel strip 14 constituting what may be termed for facilitating the description, a resistance element. This element is mounted to occupy a substantially horizontal plane, extending parallel with and within the confines of the beam 6. The central portion of the resistance element is frictionally clamped to the bracket post 12 by a cap member 15, which is secured to the post 12 by screws 16. The cap member 15 and the post 12 preferably carry a pin 17 which passes through an opening in the center of the spring 14 to prevent longitudinal shifting movement of said spring when held in connection with the bracket 10.

The outer ends of the spring 14 are likewise clamped securely and firmly in connection with webs 18 extending transversely and constituting an integral part of the beam 6, cap members 19 being employed to frictionally engage the ends of said spring so as to securely clamp the latter in connection with the webs 18. In this instance the spring element extends through slots 20 provided in the side walls of the tower 13, which slots are of sufficient area to permit of the free movement of the spring in unison with the beam 6 without interference on the part of the tower walls. It will be observed that the central portion of the spring is connected with the bracket 12 in alignment with the knife edged trunnions 5, and therefore the spring element is free to flex and bend in response to the movements of the beam without stretching the metal comprising the spring element or any other complex strain or stress whereby its long-wearing properties are jeopardized. The spring element quickly responds to restore the beam to or maintain the beam in a normal balanced position and has the advantage of being an extremely simple mechanical construction so that it may be readily incorporated in a scale of this character without materially adding to the costs of manufacture or complicating the process of manufacturing.

Connected with the beam is a cross bar 21 which extends through slots 22 provided in the opposite walls of the indicator tower. Mounted upon this bar is an upstanding indicator 23, the upper of which is adapted to move over a graduated surface viewable through openings provided in the front and rear walls of the tower. The indicator hand may be of any suitable length so as to properly multiply the movement of the beam, whereby the operators of the scale by noting the positions of the latter and of the indicator in reference to the graduated surface may determine quickly and accurately the extent of deflection of the beam from its normal position. The indicator hand is mounted directly upon the beam to oscillate in unison therewith and by this arrangement there is eliminated the necessity of employing motion transmitting device of a wearable character between the beam and the indicator.

It will be observed that by clamping the spring element to the base of the scale and also to the lever or beam I am enabled to maintain a constant position of the lever or beam in relation to the center bearing blocks. Thus, the strip or spring element forces the knife edges to maintain a desired stationary position and to occupy a fixed relation with respect to the V blocks in which they are received. Usually, these V blocks have a slight radius or curvature in the bottom and there is a tendency for the knife edges in an ordinary scale to lose their proper working positions. In the present instance this is avoided by the pressure of the spring element which forces the knife edge trunnions into proper positions in the bearing blocks provided on the base of the scale. It will be observed that in my present scale the indicator dial is mounted on the base structure and therefore to maintain accuracy it is necessary to prevent loss of position of the knife edge trunnions. This is positively assured by the inclusion of the spring element.

What is claimed is:

1. In a scale, a base, an even balance beam pivotally mounted in connection with said base, a resistance element comprising a thin flat ribbon of metallic material positioned longitudinally of said beam and arranged to lie on each side of the pivotal axis therefor, said ribbon having its ends secured to said beam and its intermediate portion anchored to said base.

2. In a scale, a base, an even balance beam, fulcrum pivots supporting said beam upon said base, and a resistance element positioned between said pivots and having a fixed connection with said base in registration with the pivots and arranged at right angles thereto, the outer ends of said resistance element being secured to said beam and positioned spaced from the connection of said element with said base.

3. In a scale, a base, an even balance beam, fulcrum pivots supporting said beam upon said base, a resistance element comprising a flat steel ribbon positioned longitudinally of the beam and arranged centrally thereof at right angles to said pivotal axis of the beam, the intermediate portion of said ribbon being secured to said base at a position in registration wth the pivotal axis of said beam and the outer ends of said ribbon being anchored to the beam at points spaced from the connection of said ribbon with said base.

4. In a scale, a base, an even balance beam fulcrumed on said base, a resistance element arranged longitudinally of said beam and connected thereto at spaced points, and a connection between said element and said base disposed intermediate the points of connection with said beam, said element being flexed upon the oscillation of said beam and serving to return said beam to a normal position of balance.

5. In a scale, in combination, a base, a beam pivoted thereon, a resilient flat ribbon arranged longitudinally of the beam and positioned flat thereupon, said ribbon extending an equal distance on each side of the central axis of said beam, the ends of said ribbon being secured to said beam at its intermediate portion and anchored to said base whereby upon the oscillation of said beam said ribbon will flex and serve to return the beam to its normal position of balance.

6. In a scale, a base, a beam pivotally mounted thereon and a non-tortional resisting element arranged longitudinally of the beam and having its end portions connected thereto, the intermediate portion of the element being secured to said base at a position in registration with the pivotal axis of said beam to said base.

In testimony whereof I affix my signature.

WALTER S. SMITH.